United States Patent [19]

Chow et al.

[11] 3,927,397

[45] Dec. 16, 1975

[54] BIAS FIELD APPARATUS FOR MAGNETIC DOMAIN MEMORY DEVICE

[75] Inventors: Ling George Chow; David S. Bartran, both of Oklahoma City, Okla.

[73] Assignee: Honeywell Information Systems Inc., Waltham, Mass.

[22] Filed: May 2, 1974

[21] Appl. No.: 466,359

[52] U.S. Cl. ...................... 340/174 TF; 340/174 BC; 340/174 PM

[51] Int. Cl.$^2$ .......................................... G11C 11/14

[58] Field of Search.. 340/174 TF, 174 PM, 174 BC

[56] References Cited

UNITED STATES PATENTS 3,503,054 3/1970 Bobeck et al. ................ 340/174 TF 3,711,841 1/1973 Geusic et al. ................ 340/174 TF

OTHER PUBLICATIONS

IBM Technical Report, TR 22.1633, by William A. Lyons, May 8, 1973.

*Primary Examiner*—James W. Moffitt

*Attorney, Agent, or Firm*—Ronald T. Reiling

[57] ABSTRACT

An improved apparatus for producing an homogeneous bias field for a magnetic domain memory device. The apparatus uses relatively thin, rectangular permanent magnets above and below a drive coil/substrates assembly. Each magnet is faced with a highly permeable plate interposed between the magnet and the drive coil/substrates assembly.

10 Claims, 4 Drawing Figures

BIAS FIELD APPARATUS FOR MAGNETIC DOMAIN MEMORY DEVICE

BACKGROUND OF THE INVENTION

The present invention relates to magnetic memory devices and more particularly to an improved bias field apparatus for use in such devices.

Magnetic domains or bubbles are minute cylindrical areas that can be generated and maintained in thin films of magnetic material. These cylindrical areas, which are magnetized in the opposite direction from the rest of the thin film material, can be propagated along Permalloy tracks on the film surface by a rotating magnetic field. Track arrangements for performing shift functions and logic operations are well known in the art.

Magnetic domains are maintained by a magnetic bias field having lines of flux ideally extending along normals to the thin film surface. The strength of the bias field is critical. A bias field which is too strong will cause the magnetic domains to shrink until they collapse inwardly, resulting in a thin film completely magnetized in one direction. A bias field which is too weak will allow the domains to grow in size until they become unstable and revert to long strip domains characteristic of a randomly magnetized thin film. Strip domains cannot be reliably propagated.

The range of domain stability for a single magnetic thin film is about 10 oersted. However, the range of field strength in a magnetic memory device must be considerably narrower since current practice calls for several thin films or chips to be mounted on a single ceramic substrate and for several substrates to be stacked in a single unit. The magnetic domains in any of the chips on any of the substrates in such an assembly can be propagated by a rotating field generated by a surrounding drive coil assembly. The drive coil assembly is, in turn, encompassed by the bias field apparatus which must establish a nearly homogeneous magnetic field over the entire volume occupied by the substrates.

Different bias magnet configurations have been suggested in the prior art. In one such configuration, a slab magnet is positioned parallel to a major surface of the drive coil/substrates assembly. A permeable plate secured to the magnet face which is away from the drive coil/substrates assembly confines the magnetic field which might otherwise interfere with proper operation of nearby electronic circuits. A second permeable plate, positioned on the opposite side of the drive coil/-substrates assembly, also serves to confine the magnetic field.

In another prior art configuration, two parallel slab magnets are deployed on opposite sides of a drive coil/-substrates assembly. Permeable plates enclose the slab magnets to confine the magnetic field.

The originator of these configurations concluded the generated bias fields were unsatisfactorily nonuniform and indicated a preference for a widely used configuration known as a Watson magnet configuration.

In a Watson magnet apparatus, two parallel bar magnets are positioned on opposite edges of the drive coil/-substrates assembly. The magnets are bridged by magnetically permeable plates which encompass the assembly. Because the permeable plates necessarily have finite permeability, the magnetic field which is established is strongest nearest the magnets and weakest midway between the two magnets. Only the area at or near the midway point has been considered sufficiently uniform to be suitable for the placement of domain chips.

To increase the usable area in a Watson magnet configuration, the surface area of the permeable plates can be increased. However, the result is a rather bulky assembly. Moreover, the Watson magnet configuration does not lend itself to the use of laminated permeable plates, which have the below-described advantage. The application of current to a drive coil adjacent an unlaminated plate sets up eddy currents in the unlaminated plate. The eddy currents increase the effective resistance of the coil, thereby increasing the power consumption of the coil. While the use of a laminated permeable plate would reduce eddy currents and thus power consumption in a Watson magnet configuration, such a plate has a much lower effective permeability in the Watson configuration than an unlaminated plate of the same thickness and thus establishes a less homogeneous field than the unlaminated plate. The relatively lower permeability of the laminated plate is due to the fact that relatively impermeable bonding layers separate the highly permeable laminae. These bonding layers cause most of the magnetic flux to be concentrated in the laminae in contact with the bar magnets in the Watson configuration. Consequently, the permeability of the laminated plate depends more on the cross-sectional area of the laminae closest to the magnets than on the combined cross-sectional area of all of the laminations.

SUMMARY OF THE INVENTION

The present invention is a compact bias field apparatus which establishes a highly homogeneous magnetic field in the volume encompassed by the apparatus. The homogenity of the field is maintained when laminated permeable plates are used to reduce power consumption.

The improved bias field apparatus which achieves these objectives includes two assemblies. Each of these assemblies has a magnet means for establishing a magnetic field over a planar area and a magnetically permeable plate contiguous to and generally coextensive with the planar area of the magnetic field. The two assemblies are spaced in a generally parallel relationship on opposite sides of a drive coil/substrates assembly by spacing means with the two magnetically permeable plates being closest the drive coil/substrates assembly.

DESCRIPTION OF THE DRAWINGS

While the specification concludes with claims particularly pointing out and distinctly claiming that which is regarded as the present invention, the details of a preferred embodiment of the invention may be more readily ascertained from the following detailed description when read in conjunction with the accompanying drawings wherein:

DETAILED DESCRIPTION

Figure 1:
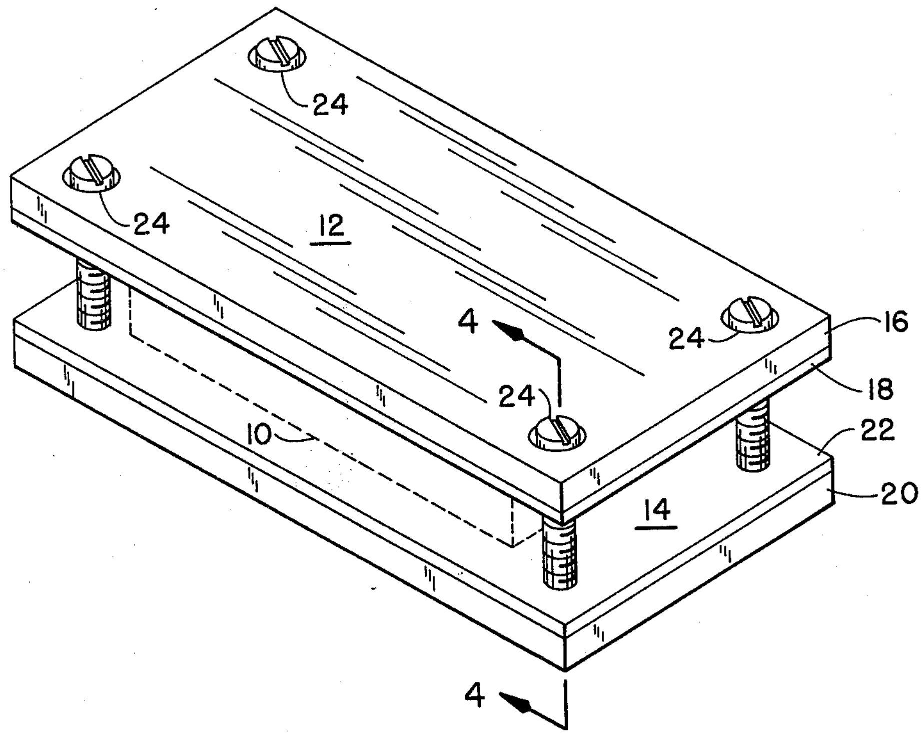
FIG. 1 is a perspective of a bias field apparatus constructed in accordance with the present invention.

Referring now to FIG. 1, drive coil/substrates assembly 10 is shown only in dotted outline form. Such an assembly includes one or more ceramic substrates, each of which carries chips of magnetic domain film. These chips are connected to input/output electronics through a number of electrical leads or conducting paths, none of which are shown. The substrates are encompassed by the orthogonal drive coil assembly. Many different types of drive coil/substrates assemblies have been developed in the prior art. The present invention would work equally well with many developed assemblies. Furthermore, since the details of a drive coil/substrates assembly are not essential to an understanding of the present invention, all such details are omitted.

The drive coil/substrates assembly 10 is encompassed by a bias field apparatus including an upper assembly 12 and a lower assembly 14. Assembly 12 includes a first magnet 16 which, in a preferred embodiment, is a permanently magnetized slab of material. Magnet 16 is faced with a first magnetically permeable plate 18 having the same rectangular configuration as the first magnet 16.

The lower assembly 14 similarly includes a second magnet 20, also preferably a permanently magnetized slab of material, and a second magnetically permeable plate 22 having the same rectangular shape as the second magnet 20. The upper assembly 12 is held generally parallel to the lower assembly 14 by spacing means, including a number of nonmagnetic bolts 24 extending through openings in the upper assembly 12 into aligned, threaded openings in the lower assembly 14. Further details as to the construction of the spacing means is provided with reference to FIG. 4.

In one embodiment of the invention, the first and second magnets are permanently magnetized slabs of ferromagnetic material about 3½ inches wide by 6 inches long by ¼ inch thick. The magnetically permeable plates 18 and 22 are as long and as wide as the magnets but are preferably about 60 mils thick.

Figure 2:
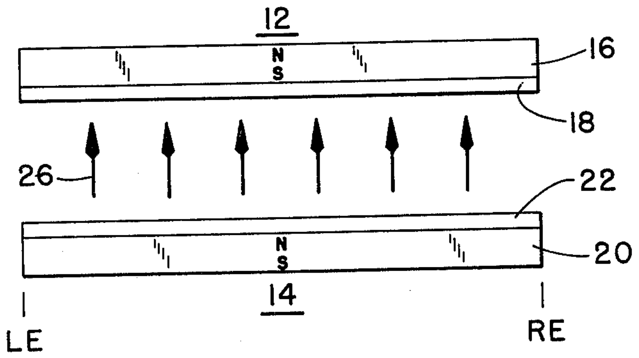
FIG. 2 is an edge view of a simplified bias field apparatus showing magnetic poles and magnetic fields.

Referring now to FIG. 2, the nonmagnetic bolts 24 have been eliminated to simplify the illustration. The first magnet 16 is shown having a north magnetic pole at the outermost surface and a south magnetic pole at its interface with the magnetically permeable plate 18. The second magnet 20 is oppositely magnetized. That is, the south magnetic pole is at its outer surface and the north magnetic pole is at the interface with the magnetically permeable plate 22. The adjacent, dissimilar magnetic poles on the magnets 16 and 20 cause a magnetic field to be established in which the lines of flux extend along parallel normals to the major surfaces of the magnets 16 and 20. The lines of flux are represented by a number of parallel arrows, only one of which has been identified by the number 26 in FIG. 2.

The magnets 16 and 20, like any other magnets, have a non-uniform distribution of surface charges due to random demagnetizing fields at the surfaces. The highly permeable plates 18 and 22 redistribute the surface charges to establish a highly homogeneous magnetic field in the volume bounded by the upper assembly 12 and lower assembly 14.

Figure 3:
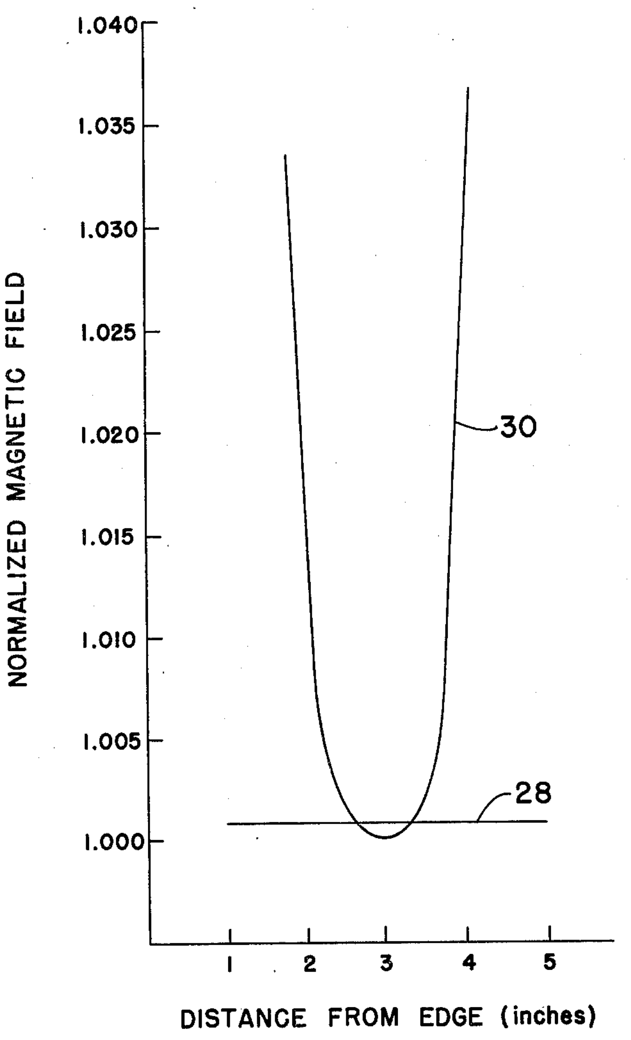
FIG. 3 shows plots of normalized magnetic fields at different locations in bias field apparatuses.

Profiles of field strengths for bias fields generated by prior art and subject magnet configurations are illustrated in FIG. 3 wherein the ordinate represents normalized magnetic field values. A normalized quantity is a ratio between an actual value and a reference value. In FIG. 3, the reference value for the magnetic field is the weakest magnetic field established by the bias field apparatus. To illustrate, assume that the weakest magnetic field at any point in an apparatus is 95 oersted and that a magnetic field of 99 oersted is measured at a second point. The normalized magnetic field value for the second point would be (99/95) or 1.042.

The abscissa of the chart represents the distance in inches from the left edge LE of a bias field apparatus to the right edge RE of that apparatus. Referring back momentarily to FIG. 2, the left edge LE and right edge RE are designated there. In a Watson magnet apparatus, the left edge LE would be the inner edge of one of the bar magnets and the right edge RE the inner edge of the other of the bar magnets.

The profile of a magnetic field generated by an apparatus constructed in the manner shown in FIG. 2 is a generally horizontal line 28 running from a point 1 inch away from the left edge LE of the apparatus to another point 1 inch away from the right edge RE of the apparatus. It can be seen that the magnetic field is quite uniform over this entire distance. The profile is shown over this distance only because field strength measurements were limited to this area. The profile should remain flat nearly to the edges LE and RE where fringing flux would result in nonuniformities. This means that the entire volume encompassed by the assemblies 12 and 14 would be suitable for placement of domain chips.

In contrast, the profile of a bias field generated by a Watson magnet apparatus is shown as a generally parabolic curve 30. The magnetic field produced by a Watson magnet apparatus has a minimum value at a point midway between the left and right edges of the apparatus. The field strength increases rapidly as the edges of the apparatus are approached. Only a small region centered on the midpoint of the apparatus is, therefore, suitable for placement of chips of magnetic domain material.

The profile of a bias field established by two parallel magnets but without interposed permeable plates generally matches the hyperbolic curve 30 for the Watson configuration. This fact makes it evident that the uniformity of the field established by the subject apparatus results from the use of the interposed, highly permeable plates.

Figure 4:
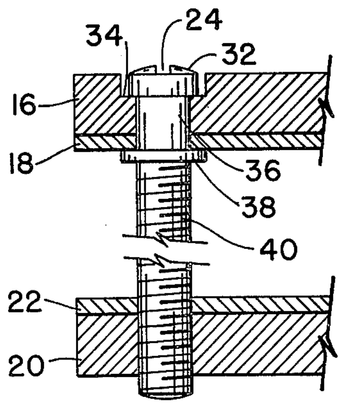
FIG 4 is a cross-sectional view taken along lines 4—4 of FIG. 1 showing a spacing means for a preferred embodiment of the present invention.

Referring now to FIG. 4, each nonmagnetic bolt 24 includes a slotted head 32 seated in a recess 34 in the surface of the magnet 16. A neck 36 on bolt 24 has a diameter slightly less than the diameter of the opening through the upper assembly 12. A retaining ring 38 is secured to the neck 36. Like the slotted head 32, the retaining ring 38 is greater in diameter than the opening through assembly 12. This arrangement allows the head to rotate within the opening while remaining axially immovable relative to the upper assembly 12. Each nonmagnetic bolt 24 also includes a threaded shank 40 which extends through a mated threaded opening in the lower assembly 14. The threads are preferably right hand threads of conventional pitch and depth.

When the nonmagnetic bolt 24 is turned in a clockwise direction, the shank 40 turns into the threaded opening in assembly 14, causing the upper assembly 12 to drawn toward the lower assembly 14. Conversely, when nonmagnetic bolt 24 is rotated in a counterclockwise direction, the shank 40 turns out of the threaded opening in lower assembly 14, increasing the separation of the assemblies 12 and 14.

The above description has treated the magnetically permeable plates 18 and 22 as if they were of unitary construction. In one embodiment of the present invention, the magnetically permeable plates 18 and 22 are laminar in construction. Each lamination may be on the order of ten mils. The laminar construction, and more particularly the bonding layers between the laminae, does not significantly effect the homogeny of the magnetic field since each laminae serves to distribute the magnetic flux directed into the plate from the adjacent magnet.

The laminae reduce the eddy currents induced during operation of the drive coil assembly. The reduction in losses due to eddy currents reduces the effective resistance of the drive coils to minimize the power which must be consumed to operate those drive coils.

While the specification has described what is believed to be a preferred embodiment of the present invention, variations and modifications will occur to those skilled in the art once they become familiar with the principles of the present invention. For example, the magnets 16 and 20 have been described as being made of permanently magnetized material. It would be within the ordinary skill of the art to substitute electromagnets which could generate the same magnetic field. Moreover, while the invention has been described for use as part of a magnetic domain memory device, it will be recognized that the invention can be used in any apparatus requiring a highly homogeneous magnetic field. Therefore, it is intended that the appended claims shall be construed to include all such variations and modifications as fall within the true spirit and scope of the invention.

We claim:

1. An improved magnetic bias field apparatus comprising:

a. a first assembly including
  i. a first magnet means for establishing a magnetic pole over a first planar area, and
  ii. a first magnetically permeable plate contiguous to and generally coextensive with the first planar area;
b. a second assembly including
  i. a second magnet means for establishing a magnetic pole over a second planar area, and
  ii. a second magnetically permeable plate contiguous to and generally coextensive with the second planar area; and
c. spacing means for holding said first and said second assemblies in generally parallel relationship with said first and said second magnetically permeable plates being between said first magnet means and said second magnet means.

2. An improved bias field apparatus as recited in claim 1 wherein said first and said second magnet means are made of permanently magnetized materials.

3. An improved bias field apparatus as recited in claim 2 wherein said spacing means includes means for varying the separation of said first and said second assemblies.

4. For use in a magnetic domain memory device including domain material chips mounted on substrates and an orthogonal drive coil assembly surrounding the substrates, an improved bias field apparatus comprising:

a. an upper assembly including
  i. a first permanent magnet having dissimilar magnetic poles at opposite major surfaces, and
  ii. a first magnetically permeable plate contiguous with one major surface of said first permanent magnet;
b. a lower assembly including
  i. a second permanent magnet having dissimilar magnetic poles at opposite major surfaces, and
  ii. a second magnetically permeable plate contiguous with one major surface of said second permanent magnet; and
c. spacing means for holding said upper assembly and said lower assembly in generally parallel relationship on opposite sides of the drive coil assembly with said first and said second magnetically permeable plates being between said first permanent magnet and said second permanent magnet and with dissimilar magnetic poles of said first and second slab magnets being adjacent.

5. An improved bias field apparatus as recited in claim 4 wherein said first and second magnetically permeable plates are laminar in construction.

6. An improved bias field apparatus as recited in claim 4 wherein said spacing means includes means for varying the separation of said first and said second assemblies.

7. An improved bias field apparatus as recited in claim 4 wherein said lower assembly includes a predetermined number of threaded openings, said upper assembly includes a like number of openings, each of which is aligned with one of the threaded openings in the lower assembly, and said spacing means comprises a like number of nonmagnetic bolts, each having a threaded shank extending into one of the threaded openings in the lower assembly and a head portion rotatable within but axially immovable with respect to the aligned opening in said upper assembly.

8. An improved bias field apparatus as recited in claim 7 wherein the number of nonmagnetic bolts and the number of openings in each of the upper and lower assemblies is four.

9. An improved bias field apparatus as recited in claim 7 wherein said first and second magnetically permeable plates are laminar in construction.

10. An improved bias field apparatus as recited in claim 8 wherein each of the upper and lower assemblies in rectangular and wherein the aligned openings and the nonmagnetic bolts are located near the corners of the rectangles.

* * * * *